United States Patent Office 2,953,603
Patented Sept. 20, 1960

2,953,603

MANUFACTURE OF ALKYL SUBSTITUTED BORANES

Donald M. Coyne, Ponca City, Okla., assignor to Continental Oil Company, Ponca City, Okla., a corporation of Delaware No Drawing. Filed Sept. 19, 1958, Ser. No. 761,935

8 Claims. (Cl. 260—606.5)

This invention relates to a simplified method for preparing valuable compounds of boron from relatively inexpensive raw materials. Specifically, this invention is a process for manufacture of trialkylborines, diborane, and tetraalkyldiboranes which does not require diborane as a raw material.

Alkylborines and alkyl-substituted diboranes are much desired compositions which are useful as high energy fuels. Prior art processes for manufacture of alkyl-substituted diboranes have been based on the use of diborane itself as a chemical intermediate. Diborane has become a strategic raw material and is quite expensive, although a great deal of effort has been expended on the improvement of processes for its manufacture. It is obviously desirable to base the manufacture of alkyl-substituted diboranes on more economical and readily available raw materials.

The primary object of the present invention is to provide a simple, economical method of making alkyl-substituted borines and diboranes. A second object of this invention is to provide a method of manufacturing substituted borines and tetraalkyldiboranes, which does not require diborane as a raw material. It is a further object of this invention to provide a process for manufacture of tetraalkyldiboranes in which the by-products are valuable and easily separated from each other. It is a further object to provide a method of manufacturing alkyl-substituted borines and diboranes which is based on easily manufactured and readily available aluminum and boron compounds.

Other objects will appear from the following specification.

Briefly, I have discovered that by reacting aluminum compounds of the empirical formula $AlR_{3-n}H_n$, where R represents branched or unbranched alkyl groups, alike or unlike, such as ethyl, propyl, octyl, etc., and $n$ may vary from 1 to 3, with a compound of the general formula $BX_3$, where X represents reactively bound monovalent non-metallic substituents, alike or unlike, as for example, halogen or alkoxy, it is possible to synthesize mixtures of various proportions of boron compounds which may be represented collectively by the empirical formulas $B_2R_{6-2n}H_{2n}$ and $BR_3$, all of which are valuable and may be easily separated from each other. This has not been accomplished previously, to my knowledge, without the use of diborane as one of the raw materials.

The principal reactions which are involved may be represented as follows:

(1) 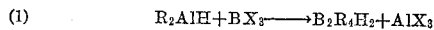

(2) 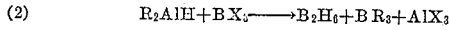

(The aluminum compound is represented by the empirical formula $R_2AlH$ for the sake of simplicity, although the opinion is current among workers in the field that it exists as a dimer.) The $R_2AlH$ type of compound is preferred, as it is more readily obtainable and yields a valuable product mixture. It should be mentioned that use of an aluminum compound of uniform purity is important if uniform results are expected.

In order that those skilled in the art may better understand how the present invention may be carried into effect, the following examples are given by way of illustration and not by way of limitation. All yields are based on $BX_3$ consumed, unless otherwise indicated.

Example I

A 1-liter, 3-necked flask, equipped with a dropping funnel, stirrer, and Dry Ice-acetone condenser, was charged with 500 ml. of n-hexane and 78 grams (0.92 mole) of diethylaluminum hydride. To this mixture was added slowly over a 2-hour period, 120 grams (0.84 mole) of boron trifluoride etherate. The exothermic nature of the reaction caused the n-hexane to reflux. The reaction was heated at reflux temperature for 2 hours after the addition. The aluminum fluoride was filtered and the filtrate stripped of hexane and ether at a low temperature under partial vacuum. The liquid residue was distilled. A yield of 40 percent tetraethyldiborane, B.P. 112° C., was obtained.

Identification of the tetraethyldiborane was accomplished in several ways. Hydrolysis in acid solution evolved 95 percent of the theoretical quantity of hydrogen gas. The molecular weight determined by the cryoscopic technique was 133 (theor. 140). Mass spectrum analysis showed the molecular weight to be 140.

The overall reaction,

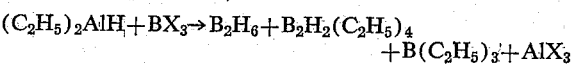

may be carried out using a great variety of compounds of boron in which X is a monovalent non-metallic substituent, as most compounds of this type are fairly reactive. For the sake of economy and convenience it is preferable to use compounds which are easily made from boric oxide and boric acid, which includes, besides boron halide, borate esters and boron halide complexes, for example, $BF_3 \cdot O(C_2H_5)_2$, $B(OCH_3)_3$, $B(OCH_2CH(CH_3)_2)_3$ and borates derived from mixtures of alcohols. The following example illustrates the manufacture of a tetraalkyldiborane and a trialkylborine from an alkyl borate ester.

Example II

A 1-liter, 2-necked flask fitted with a cold finger condenser, mechanical stirrer, and dropping funnel was charged with 500 ml. of dry n-hexane and 86.0 grams (1.0 mole) of $(C_2H_5)_2AlH$. To this mixture was added 98.3 grams (0.95 mole) of $B(OCH_3)_3$ over a 2-hour period so that the temperature was maintained at the reflux temperature of n-hexane. The reaction was initially very violent but became somewhat sluggish toward the final addition. A precipitate, presumably $Al(OCH_3)_3$ was first noted when approximately 20 ml. of the $B(OCH_3)_3$ had been added.

The reaction mixture was maintained at the reflux temperature of hexane for an additional 2 hours, cooled, filtered, and the n-hexane was removed by evaporation at reduced pressure. Fractionation of the remaining mixture gave 27.4 grams of $B_2H_2(C_2H_5)_4$ (44% yield) and 13.6 grams of $B(C_2H_5)_3$ (21% yield).

It is preferred to employ an inert solvent diluent in this process. Suitable solvents include hydrocarbons, such as n-hexane, benzene, and xylene, as well as ethers, such as dibutyl, diethyl and dihexyl, and di-ethers of glycol and diethylene glycol. The process is operable at temperatures above −30° C., and may be operated with good yields at temperatures as high as 150° C., or even higher. Below are tabulated results obtained under a variety of reaction conditions and with various boron compounds as raw materials. The aluminum compound used was $(C_2H_5)_2AlH$. All yields are based on $BX_3$ consumed.

| $BX_3$ | Solv. | Temp.(°C.) | Percent $B_2H_2Et_4$ | Percent $BEt_3$ |
|---|---|---|---|---|
| $BF_3 \cdot O(C_2H_5)_2$ | n-hexane | 64 | 40 | (1) |
| $B(OCH_3)_3$ | n-hexane | 68 | 44 | 21 |
| $BF_3 \cdot O(C_2H_5)_2$ | n-hexane | 45 | 23 | 10 |
| $BF_3 \cdot O(C_2H_5)_2$ | n-hexane | −20 to −30 | 10 | 26 |
| $B(OCH_3)_3$ | xylene | 100 to 110 | 29 | 11 |
| $B(OCH_3)_3$ | n-dodecane | 150 | 63 | 18 |
| $B(OCH_3)_3$ | xylene | 140 | 50 | 8 |
| $B(OCH(CH_3)_2)_3$ | xylene | 100 | 6 | 89 |
| $B(OCH_2CH(CH_3)_2)_3$ | xylene | 140 | 23 | 72 |
| $B(OCH_2CH(CH_3)_2)_3$ | decalin | 105 | 29 | 57 |
| $B(OCH_2CH(CH_3)_2)_3$ | decalin | 105 | None | 57 |

1 Not determined.

It will be appreciated that the process of this invention possesses some obvious advantages aside from providing a simple, direct route to tetraalkyldiboranes. It is true that by-products are formed by this method principally diborane and trialkylborines; but the reaction products are quite easily separated by distillation and they are all valuable, so that by-products do not become a burden and thereby increase the cost of operation. Diborane is already a well-established commercial product, finding a ready market as a raw material for manufacture of high-energy fuels. The trialkylborines are also useful as raw materials and even as components of high energy fuels. If desired, the trialkylborine and diborane may both be utilized to manufacture tetraalkyldiborane, thereby increasing overall yield of this product. Continuous processes may readily be designed to utilize the novel method of this invention, and this process may be integrated with a variety of other processes which utilize the by-products. For example, the aluminum alkoxides may be used to manufacture certain valuable types of alumina and also alcohols, which latter can then be recycled to borate ester preparation. Other less obvious advantages, as well as many modifications which lie within the scope of this invention, will occur to those who are skilled in the art.

What is considered new and inventive in the present invention is defined in the hereunto appended claims, it being understood, of course, that equivalents known to those skilled in the art are to be construed as within the scope and purview of the claims.

I claim:

1. The method of manufacturing boron compounds represented by the formula $B_2R_{6-2n}H_{2n}$ wherein R is alkyl and $n$ may vary from 1 to 3, comprising the reaction in an inert solvent-diluent under substantially anhydrous conditions of an alkylaluminum hydride and a boron compound represented by the formula $BX_3$ wherein X is a substituent selected from the group consisting of halide and alkoxy radicals and then recovering said boron compounds from the reaction products.

2. The method of claim 1 in which the boron compound is present in the form of a co-ordination complex with an aliphatic ether.

3. The method of manufacturing a tetraalkyldiborane comprising the reaction in an inert solvent-diluent under substantially anhydrous conditions of a dialkylaluminum hydride and a boron trihalide and recovering the tetraalkyldiborane from the reaction products.

4. The method of manufacturing a tetraalkyldiborane comprising the reaction in an inert solvent-diluent under substantially anhydrous conditions of a dialkylaluminum hydride and a trialkyl borate and recovering the tetraalkyldiborane from the reaction products.

5. The method of manufacturing tetraethyldiborane comprising the reaction in an inert solvent-diluent under substantially anhydrous conditions of diethylaluminum hydride and boron trifluoride etherate and then recovering the tetraethyldiborane from the reaction products.

6. The method of manufacturing tetraethyldiborane comprising the reaction in an inert solvent-diluent under substantially anhydrous conditions of diethylaluminum hydride and a trialkyl borate.

7. The method of manufacturing a tetraalkyldiborane comprising the reaction under substantially anhydrous conditions of a dialkylaluminum hydride and a trialkyl borate.

8. The method of manufacturing a tetraalkyldiborane comprising the reaction under substantially anhydrous conditions of a dialkylaluminum hydride and a boron trihalide.

References Cited in the file of this patent

Schlesinger et al.: Chem. Reviews, vol. 31, pages 13–5 (1942).

Finholt et al.: J. Am. Chem. Soc., vol. 69, pages 1199–1203 (1947).

Goubeau: Fiat, Reviews of German Science, Inorganic Chemistry, vol. I, pages 215–238 (1948).

Disclaimer 2,953,603.—*Donald M. Coyne*, Ponca City, Okla. MANUFACTURE OF ALKYL SUBSTITUTED BORANES. Patent dated Sept. 20, 1960. Disclaimer filed Mar. 18, 1965, by the assignee, *Continental Oil Company*.

Hereby enters this disclaimer to claim 1 of said patent.
[*Official Gazette June 15, 1965.*]